(12) United States Patent
Miyake et al.

(10) Patent No.: US 12,498,721 B2
(45) Date of Patent: Dec. 16, 2025

(54) AUTONOMOUS TRAVELING SYSTEM FOR WORKING VEHICLE TO TRAVEL AUTONOMOUSLY

(71) Applicant: Yanmar Power Technology Co., Ltd., Osaka (JP)

(72) Inventors: Koji Miyake, Osaka (JP); Shoichi Nakamura, Osaka (JP); Keisuke Iwamura, Osaka (JP); Tomoyuki Kuroda, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 615 days.

(21) Appl. No.: 17/434,428

(22) PCT Filed: Dec. 19, 2019

(86) PCT No.: PCT/JP2019/049787
§ 371 (c)(1),
(2) Date: Aug. 27, 2021

(87) PCT Pub. No.: WO2020/174839
PCT Pub. Date: Sep. 3, 2020

(65) Prior Publication Data
US 2022/0147046 A1    May 12, 2022

(30) Foreign Application Priority Data
Feb. 28, 2019    (JP) .................................. 2019-035975

(51) Int. Cl.
*G05D 1/02*    (2020.01)
*A01B 69/04*    (2006.01)
(Continued)

(52) U.S. Cl.
CPC ......... *G05D 1/0212* (2013.01); *A01B 69/008* (2013.01); *A01C 11/003* (2013.01);
(Continued)

(58) Field of Classification Search
CPC ........ G05D 1/0212; G05D 2201/0201; B60W 60/0025; B60W 10/04; B60W 10/20; B60W 2300/15; A01B 69/008
See application file for complete search history.

(56) References Cited

U.S. PATENT DOCUMENTS

2017/0144702 A1*    5/2017    Dang .................... B62D 6/001

FOREIGN PATENT DOCUMENTS

JP    2002051607 A  *  2/2002    ............. A01B 63/08
JP    2018117558 A  *  8/2018    ........... A01B 69/008
(Continued)

OTHER PUBLICATIONS

JP-2002051607-A—Machine Translation—Hyodo et al. (Year: 2002).*
(Continued)

*Primary Examiner* — Scott A Browne
*Assistant Examiner* — Rami Nabih Bedewi
(74) *Attorney, Agent, or Firm* — Chris Mizumoto

(57) ABSTRACT

This autonomous traveling system is provided with a path preparation unit, a forward movement control unit, a backward movement control unit, and a turn control unit. The path preparation unit prepares a plurality of straight line paths. The forward movement control unit causes a machine to execute work and simultaneously causes the machine to travel along a straight line path by at least autonomous steering. After an operator has stopped the machine traveling toward an edge of a field, the backward movement control unit causes the machine to travel backward autonomously or operationally by the operator, without executing any work. After the machine moving backward has stopped, and an instruction for forward movement has been provided by the operator, the turn control unit causes the machine to turn toward a predetermined straight line path by performing at least autonomous steering without executing any work.

6 Claims, 10 Drawing Sheets

(51) Int. Cl.
  *A01C 11/00* (2006.01)
  *A01C 11/02* (2006.01)
  *B60W 10/04* (2006.01)
  *B60W 10/20* (2006.01)
  *B60W 60/00* (2020.01)
  *G05D 1/00* (2006.01)
  *G05D 1/43* (2024.01)
  *G05D 1/648* (2024.01)

(52) U.S. Cl.
  CPC .............. *A01C 11/02* (2013.01); *B60W 10/04* (2013.01); *B60W 10/20* (2013.01); *B60W 60/0025* (2020.02); *B60W 2300/15* (2013.01)

(56) References Cited

FOREIGN PATENT DOCUMENTS

JP  2018117560 A  8/2018
WO  2011114671 A1  9/2011

OTHER PUBLICATIONS

Machine Translation—JP2002051607A—Hyodo et al. (Year: 2000).*
Machine Translation of foreign reference: JP 2002051607 A—Hyodo et al. (Year: 2000).*
Machine Translation of foreign reference: JP 2018117558 A—Miyamoto et al. (Year: 2017).*

* cited by examiner

//  AUTONOMOUS TRAVELING SYSTEM FOR WORKING VEHICLE TO TRAVEL AUTONOMOUSLY

CROSS-REFERENCE

This application is a US National Stage Application under 35 U.S.C. § 371 of International Application No. PCT/JP2019/049787 filed Dec. 19, 2019, which claims foreign priority of JP2019-035975 filed Feb. 28, 2019, the disclosures of which are hereby incorporated by reference in their entirety.

TECHNICAL FIELD

The present invention chiefly relates to an autonomous travel system that causes a working vehicle to autonomously travel.

BACKGROUND ART

Patent Literature 1 discloses the configuration, in which a traveling route including linear routes arrayed in a farm field and turning routes connecting the linear routes together is created and a working vehicle is made to autonomously travel along the traveling route. The working vehicle conducts a work on the farm field when traveling along a linear route and does not conduct the work on the farm field when traveling along a turning route.

CITATION LIST

Patent Literature

Patent Literature 1: JP 2018-117560 A

DISCLOSURE OF INVENTION

Problems to be Solved by the Invention

If the turning of the working vehicle is to be started in a position specified in advance as stated in Patent Literature 1, a position with room is set as a turning start position in order to allow the working vehicle to turn certainly and appropriately. As a result, in the farm field, a region where the working vehicle conducts the work along the linear routes is narrowed.

The present invention has been made in view of such circumstances, and a primary object of the present invention is to provide an autonomous travel system that causes a working vehicle to autonomously travel in a farm field and has a configuration allowing the enlargement of a region where the working vehicle conducts a work along a linear route.

Means for Solving the Problems

The problem to be solved by the present invention is as above, and the means for solving the problem and effects of the means are described below.

According to an aspect of the present invention, an autonomous travel system with the following configuration is provided. In other words, the autonomous travel system includes a route creation unit, a forward movement control unit, a backward movement control unit, and a turning control unit. The route creation unit creates a plurality of linear routes arrayed in a farm field. The forward movement control unit autonomously implements at least steerage to cause a working vehicle to travel along the plurality of linear routes while causing the working vehicle to conduct a work. The backward movement control unit causes the working vehicle to move backward either according to an operation by an operator or autonomously, without causing the working vehicle to conduct the work, after the operator stops the working vehicle, which is traveling toward an edge of the farm field. The turning control unit autonomously implements at least the steerage to cause the working vehicle to turn toward a linear route designated in advance without causing the working vehicle to conduct the work, on condition that a forward movement instruction is given by the operator after the working vehicle, which is being caused to move backward by the backward movement control unit, is stopped either by the operator or autonomously.

Owing to such configuration, which gives the operator the charge of stopping the working vehicle in the vicinity of the edge of the farm field, it is possible to conduct the work closer to the edge of the farm field as compared with the case where the working vehicle is made to autonomously stop. As a result, the region, where the working vehicle conducts the work along the linear routes, is enlarged. In addition, the forward movement instruction from the operator is assumed as one of turning start conditions, so that instructions of the operator are simplified and turning is started earlier.

In the autonomous travel system as above, it is preferable that the turning control unit sets a turning route connecting with the linear route designated in advance and causes the working vehicle to turn along the turning route.

The turning route as set allows the working vehicle to turn more certainly until reaching the linear route.

In the autonomous travel system as above, it is preferable that the backward movement control unit autonomously implements at least the steerage to cause the working vehicle to move backward along the plurality of linear routes without causing the working vehicle to conduct the work.

In consequence, the working vehicle passes through almost the same positions during the forward movement and during the backward movement, which prevents a traveling trace from being left in an unwanted position.

The autonomous travel system as above preferably has the following configuration. In other words, the autonomous travel system includes a calculation unit and a notification unit. The calculation unit calculates a first distance as a distance, which the working vehicle travels for a period of meeting measurement conditions, while the working vehicle is traveling toward the edge of the farm field. The notification unit notifies the operator of information on a stop position of the working vehicle based on the first distance while the working vehicle is being caused to move backward by the backward movement control unit.

Owing to such configuration, it is possible to let the operator know the position, where the working vehicle should be stopped, if the operator is to stop the working vehicle during the backward movement.

The autonomous travel system as above preferably has the following configuration. In other words, the calculation unit further calculates a distance condition as a condition about a distance from the working vehicle to the edge of the farm field based on the first distance. The distance condition is additionally included as a condition, under which the turning control unit starts turning of the working vehicle.

Owing to such configuration, turning is not started in a position too close to the edge of the farm field, for instance, so that an unreasonable turning is prevented.

DESCRIPTION OF EMBODIMENTS

Figure 1:
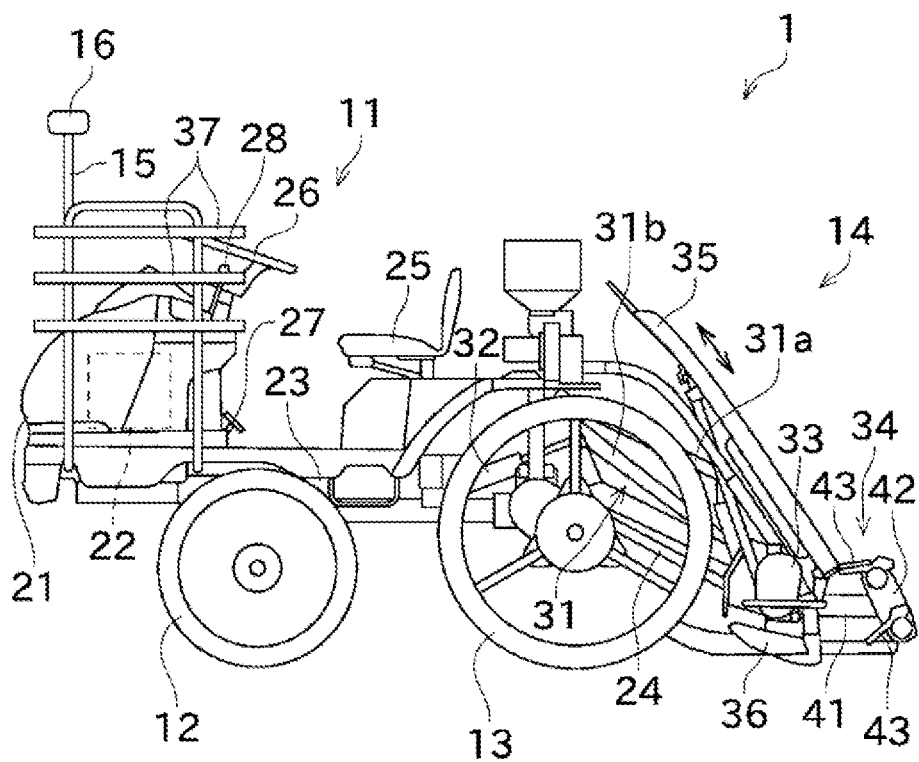
FIG. 1 A side view of a rice seeding transplanting machine to be made to autonomously travel in an autonomous travel system according to a first embodiment.
Figure 2:
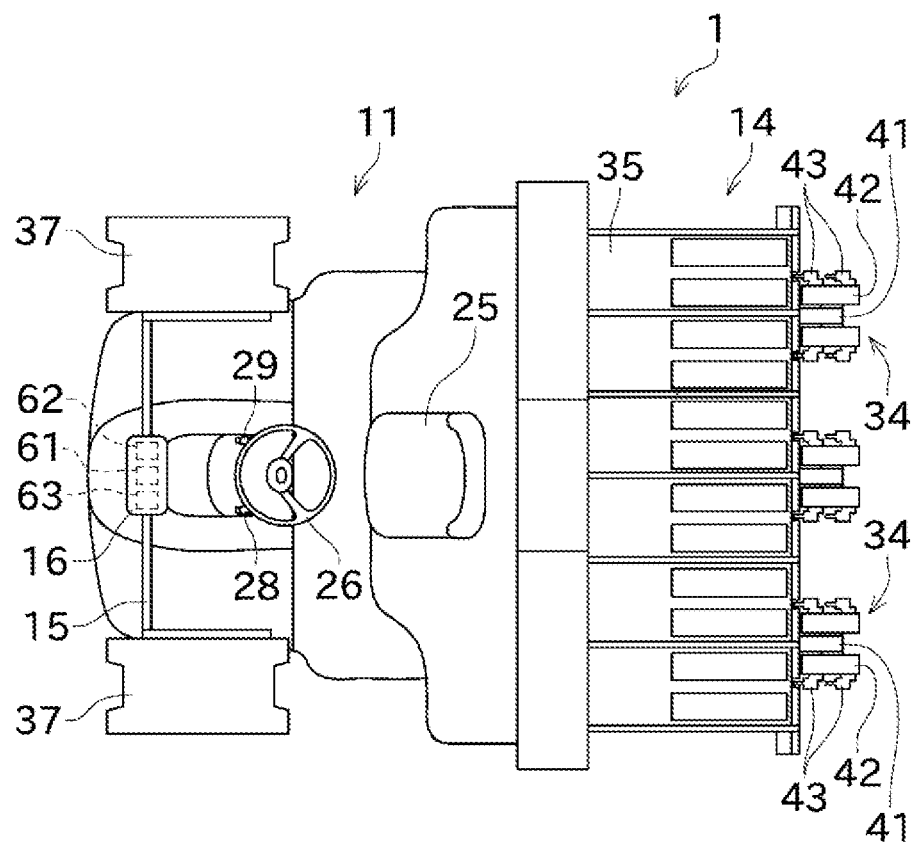
FIG. 2 A plan view of the rice seedling transplanting machine.
Figure 3:
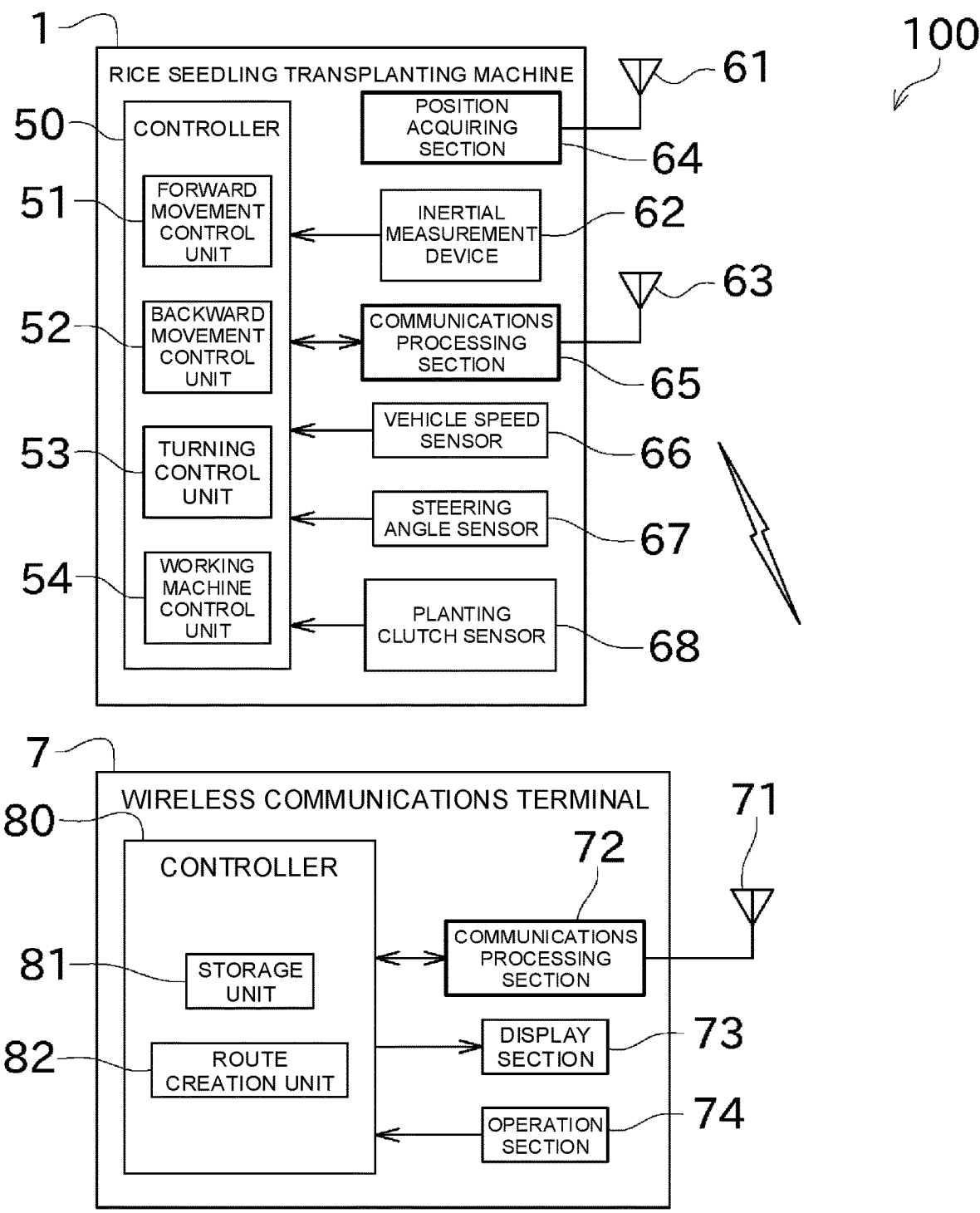
FIG. 3 A block diagram illustrating the rice seeding transplanting machine and a wireless communications terminal.

In the following, embodiments of the present invention are described with reference to the drawings. FIG. 1 is a side view of a rice seedling transplanting machine 1 used in an autonomous travel system 100 according to a first embodiment of the present invention. FIG. 2 is a plan view of the rice seedling transplanting machine 1. FIG. 3 is a block diagram illustrating the rice seedling transplanting machine 1 and a wireless communications terminal 7.

The autonomous travel system 100 of the present embodiment uses the rice seedling transplanting machine 1 as a working vehicle that conducts a work in a farm field, and an operator uses the wireless communications terminal 7 or the like to give an instruction so as to cause the rice seedling transplanting machine 1 to conduct a work (farm work such as planting of seedlings) while causing the rice seedling transplanting machine 1 to autonomously travel. An instruction as to autonomous travel may be given not by using the wireless communications terminal 7 but by operating an operation device provided on the working vehicle such as the rice seedling transplanting machine 1. In the present invention, the working vehicle is not limited to the rice seedling transplanting machine 1, and a seeder, a tractor, a combine, and the like are usable.

The autonomous travel means that a device involved with traveling is controlled by a controller provided on the rice seedling transplanting machine 1 and at least steerage is autonomously implemented so that a route specified in advance may be followed. Apart from the steerage, vehicle speed regulation or a work by a working machine may autonomously be implemented. In the autonomous travel, autonomous travel when a person is on the rice seedling transplanting machine 1 and autonomous travel when no person is on the rice seedling transplanting machine 1 are incorporated.

As illustrated in FIGS. 1 and 2, the rice seedling transplanting machine 1 includes a vehicle body part 11, a front wheel 12, a rear wheel 13, and a planting part (working part) 14. The front wheel 12 and the rear wheel 13 are each provided on the right and left of the vehicle body part 11 in the form of a pair of wheels.

The vehicle body part 11 includes a hood 21. The hood 21 is provided in a front portion of the vehicle body part 11. Inside the hood 21, an engine 22 is provided.

Power generated by the engine 22 is transmitted to the front wheel 12 and the rear wheel 13 through a transmission case 23. The power is also transmitted to the planting part 14 through the transmission case 23 and a PTO shaft 24 arranged in a rear portion of the vehicle body part 11.

The vehicle body part 11 further includes a driver seat 25 and a plurality of operation members. On the driver seat 25, the operator can sit. The driver seat 25 is arranged between the front wheel 12 and the rear wheel 13 in a front and rear direction of the vehicle body part 11. The operation members include a steerage handle 26, a speed changing operation pedal 27, a main speed change lever 28, and a planting clutch lever 29.

The steerage handle 26 is operated so as to steer the rice seedling transplanting machine 1. The speed changing operation pedal 27 is operated so as to regulate a traveling speed (vehicle speed) of the rice seedling transplanting machine 1. The main speed change lever 28 is so formed as to allow the choice between "forward movement", "backward movement", and "stoppage", for instance. If the main speed change lever 28 is put in a "forward movement" position, the power is transmitted so that the rear wheel 13 may rotate in a direction allowing the forward movement of the rice seedling transplanting machine 1. If the main speed change lever 28 is put in a "backward movement" position, the power is transmitted so that the rear wheel 13 may rotate in a direction allowing the backward movement of the rice seedling transplanting machine 1. If the main speed change lever 28 is put in a "stoppage" position, transmission of the power to the front wheel 12 and the rear wheel 13 is blocked. The "forward movement" may be distinguished between forward movement at a "low speed" for the traveling in a farm field and forward movement at a "high speed" for the traveling outside a farm field. The planting clutch lever 29 is operated so as to change from a transmission state where a planting clutch transmits the power to the PTO shaft 24 (namely, the planting part 14) to a blockage state where the planting clutch does not transmit the power to the PTO shaft 24 (namely, the planting part 14), and vice versa.

The planting part 14 is arranged at the rear of the vehicle body part 11. The planting part 14 is coupled to the vehicle body part 11 through an elevating link mechanism 31. The elevating link mechanism 31 is constituted of parallel links including a top link 31a and a lower link 31b.

In the elevating link mechanism 31, an elevation cylinder 32 of an elevation apparatus is coupled to the lower link 31b. The elevation apparatus is capable of causing the planting part 14 to go up and down with respect to the vehicle body part 11 by extending and retracting the elevation cylinder 32. The elevation cylinder 32, which is a hydraulic cylinder in the present embodiment, may be an electric cylinder. The elevation apparatus may cause the planting part 14 to go up and down with an actuator other than a cylinder.

The planting part 14 includes a planting input case part 33, a plurality of planting units 34, a seedling stand 35, a plurality of floats 36, and reserve seedling racks 37. The planting part 14 is capable of sequentially feeding seedlings from the seedling stand 35 to each planting unit 34 so as to successively plant the seedlings.

Each planting unit 34 includes a planting transmission case part 41 and rotary case parts 42. To the planting transmission case part 41, the power is transmitted through the PTO shaft 24 and the planting input case part 33.

The rotary case parts 42 are each rotatably attached to the planting transmission case part 41. The rotary case parts 42 are arranged on both sides in a vehicle width direction of the planting transmission case part 41. To one side of each rotary case part 42, two planting claws 43 are attached.

The two planting claws 43 are aligned with each other in a moving direction of the rice seedling transplanting machine 1. The two planting claws 43 are displaced as the rotary case part 42 rotates. By the displacement of the two planting claws 43, the planting of seedlings for one row is carried out.

The seedling stand 35 is arranged above in front of the planting units 34. On the seedling stand 35, seedling mats are placeable. The seedling stand 35 is capable of feeding seedlings of a seedling mat placed on the seedling stand 35 to each planting unit 34.

Specifically, the seedling stand 35 is so formed as to reciprocate in the vehicle width direction, that is to say, to be movable for lateral feed (slidable in a lateral direction). In addition, the seedling stand 35 is so formed as to be capable of intermittently conveying seedling mats downward for vertical feed at a reciprocation end of the seedling stand 35.

The floats 36 are each swingably provided in a lower portion of the planting part 14. A bottom face of each float 36 can be brought into contact with a surface of a farm field in order to stabilize the planting position of the planting part 14 with respect to the surface of a farm field.

The reserve seedling racks 37 are provided on the right and left of the vehicle body part 11 to make a pair. The reserve seedling racks 37 are each arranged outside the hood 21 in the vehicle width direction. The reserve seedling racks 37 can be loaded with a seedling box containing reserve mat seedlings.

Upper portions of the reserve seedling racks 37 as provided on the right and left to make a pair are coupled to each other by a coupling frame 15 extending in a vertical direction and the vehicle width direction. In a center in the vehicle width direction of the coupling frame 15, a casing 16 is provided. In the casing 16, a positioning antenna 61, an inertial measurement device 62, and a communications antenna 63 are provided.

The positioning antenna 61 is capable of receiving a radio wave from a positioning satellite constituting a satellite positioning system (GNSS). A known positioning calculation is performed based on the radio wave so as to acquire the position of the rice seedling transplanting machine 1.

The inertial measurement device 62 includes three gyro sensors (angular velocity sensors) and three acceleration sensors. The angular velocity and the acceleration of the rice seedling transplanting machine 1, which are detected by the inertial measurement device 62, are supplementarily used to improve the accuracy of a result of positioning of the rice seedling transplanting machine 1.

The communications antenna 63 is an antenna for performing wireless communication with the wireless communications terminal 7 illustrated in FIG. 3. The rice seedling transplanting machine 1 is provided with a portable communications antenna not illustrated, for the communication using a portable telephone line and the Internet.

A controller 50 illustrated in FIG. 3 includes an arithmetic device, a storage device, and input and output parts, all being not illustrated. In the storage device, various programs, data, and the like are stored. The arithmetic device is capable of reading various programs from the storage device and executing the programs. The cooperation between the hardware as above and software allows the controller 50 to serve as a forward movement control unit 51, a backward movement control unit 52, a turning control unit 53, and a working machine control unit 54. The controller 50 may be constituted of a single hardware component or a plurality of hardware components capable of communicating with one another. To the controller 50, not only the inertial measurement device 62 but a position acquiring section 64, a communications processing section 65, a vehicle speed sensor 66, a steering angle sensor 67, and a planting clutch sensor 68 are connected.

The position acquiring section 64 is electrically connected to the positioning antenna 61. The position acquiring section 64 acquires, from a positioning signal received by the positioning antenna 61, the position of the rice seedling transplanting machine 1 as information on the latitude and the longitude, for instance. The position acquiring section 64 receives a positioning signal from a reference station not illustrated by an appropriate method and then uses a known GNSS-RTK method to perform positioning. Instead of such positioning, positioning using differential GNSS or independent positioning may be performed. Position acquirement based on the radio field intensity of a wireless LAN or the like or position acquirement by inertial navigation may also be performed.

The communications processing section 65 is electrically connected to the communications antenna 63. The communications processing section 65 is capable of performing modulation processing or demodulation processing in an appropriate mode so as to perform data transmission to and data reception from the wireless communications terminal 7.

The vehicle speed sensor 66 is capable of detecting the vehicle speed of the rice seedling transplanting machine 1. The vehicle speed sensor 66 is provided in an appropriate position on the rice seedling transplanting machine 1, that is to say, can be provided on an axle of the front wheel 12, for instance. In that case, the vehicle speed sensor 66 generates pulses according to the rotation of the axle of the front wheel 12. Data on detection results obtained in the vehicle speed sensor 66 are output to the controller 50.

The steering angle sensor 67 is capable of detecting the steering angle of the front wheel 12. The steering angle sensor 67 is provided in an appropriate position on the rice seedling transplanting machine 1, that is to say, can be provided on a kingpin not illustrated that is provided on the front wheel 12, for instance. The steering angle sensor 67 may be provided on the steerage handle 26. Data on detection results obtained in the steering angle sensor 67 are output to the controller 50.

The planting clutch sensor 68 is a sensor for detecting the position of the planting clutch lever 29. The result of detection by the planting clutch sensor 68 is output to the controller 50. The controller 50 is able to determine whether a planting work is performed, based on the result of detection by the planting clutch sensor 68. Data on detection results obtained in the planting clutch sensor 68 are output to the controller 50. The planting clutch sensor 68 may determine whether the planting work is performed, based on the state of not the planting clutch lever 29 but other member (based on whether the PTO shaft 24 located downstream from the planting clutch is rotating, for instance).

The forward movement control unit 51, the backward movement control unit 52, and the turning control unit 53 are capable of implementing control related to the travel of the rice seedling transplanting machine 1 (vehicle speed control and steerage control, for instance). The forward movement control unit 51 implements control related to the forward movement of the rice seedling transplanting machine 1. The backward movement control unit 52 implements control related to the backward movement of the rice seedling transplanting machine 1. The turning control unit 53 implements control related to the turning of the rice seedling transplanting machine 1. In the following description, the forward movement control unit 51, the backward movement control unit 52, and the turning control unit 53 are also referred to collectively as a "travel control unit". The travel control unit implements control related to the autonomous travel of the rice seedling transplanting machine 1. In addition, the travel control unit can implement control to cause the rice seedling transplanting machine 1 to travel according to an operation by the operator. It is also possible for the travel control unit to autonomously implement steerage and, at the same time, implement control to change the vehicle speed according to an operation by the operator.

If autonomously changing the vehicle speed, the travel control unit implements control to make a current vehicle speed that is obtained based on the result of detection by the vehicle speed sensor 66 more approximate to a target vehicle speed. Such control is carried out by changing either or both of the gear ratio of a transmission in the transmission case 23 and the rotation speed of the engine 22. The vehicle speed control as above includes control to make the vehicle speed zero so that the rice seedling transplanting machine 1 may stop.

If autonomously implementing steerage, the travel control unit implements control to make a current steering angle that is obtained based on the result of detection by the steering angle sensor 67 more approximate to a target steering angle. Such control is carried out by driving a steerage actuator provided on a rotation shaft of the steerage handle 26, for instance. With respect to the steerage control, the travel control unit may directly adjust a steerage angle of the front wheel 12 of the rice seedling transplanting machine 1 instead of adjusting a rotation angle of the steerage handle 26.

The working machine control unit 54 can control actions (up and down motion, planting work, and the like) of the planting part 14 based on a condition specified in advance.

The wireless communications terminal 7 is a tablet terminal and includes a communications antenna 71, a communications processing section 72, a display section 73, an operation section 74, and a controller 80. The wireless communications terminal 7 is not limited to the tablet terminal but may be a smartphone or a notebook computer. The wireless communications terminal 7 performs various kinds of processing related to the autonomous travel of the rice seedling transplanting machine 1 as will be described later, while at least part of such processing can be performed by the controller 50 of the rice seedling transplanting machine 1. It is also possible that at least part of various kinds of processing related to the autonomous travel to be performed by the controller 50 of the rice seedling transplanting machine 1 is performed by the wireless communications terminal 7.

The communications antenna 71 is a short-range communications antenna for wireless communication with the rice seedling transplanting machine 1. The communications processing section 72 is electrically connected to the communications antenna 71. The communications processing section 72 is capable of performing modulation processing or demodulation processing in an appropriate mode so as to perform data transmission to and data reception from the rice seedling transplanting machine 1. Since the rice seedling transplanting machine 1 is connectable to a portable telephone line as described above, the wireless communications terminal 7 can be connected to a portable telephone line through the rice seedling transplanting machine 1. Consequently, part of information stored in the controller 50 or the controller 80, for instance, can be stored in an external server. The portable communications antenna may be provided not on the rice seedling transplanting machine 1 but on the wireless communications terminal 7.

The display section 73 is a liquid crystal display or an organic EL display and is so formed as to display images. The display section 73 is capable of displaying information on the autonomous travel, information on the setting of the rice seedling transplanting machine 1, results of detection by various sensors, and warning information, for instance. The operation section 74 includes a touch panel and a hardware key. The touch panel is arranged on top of the display section 73 and is capable of detecting an operation with the operator's finger or the like. The hardware key is arranged on a side face of a housing of the wireless communications terminal 7 or on the periphery of the display section 73, for instance, and is operable to the operator through pressing. The wireless communications terminal 7 may be so formed as to only include either of the touch panel and the hardware key.

The controller 80 includes an arithmetic device, a storage device, and input and output parts, all being not illustrated. In the storage device, various programs, data, and the like are stored. The arithmetic device is capable of reading various programs from the storage device and executing the programs. The cooperation between the hardware as above and software allows the controller 80 to serve as a storage unit 81 and a route creation unit 82. Processing performed by the individual units of the controller 80 is to be described later.

Figure 4:
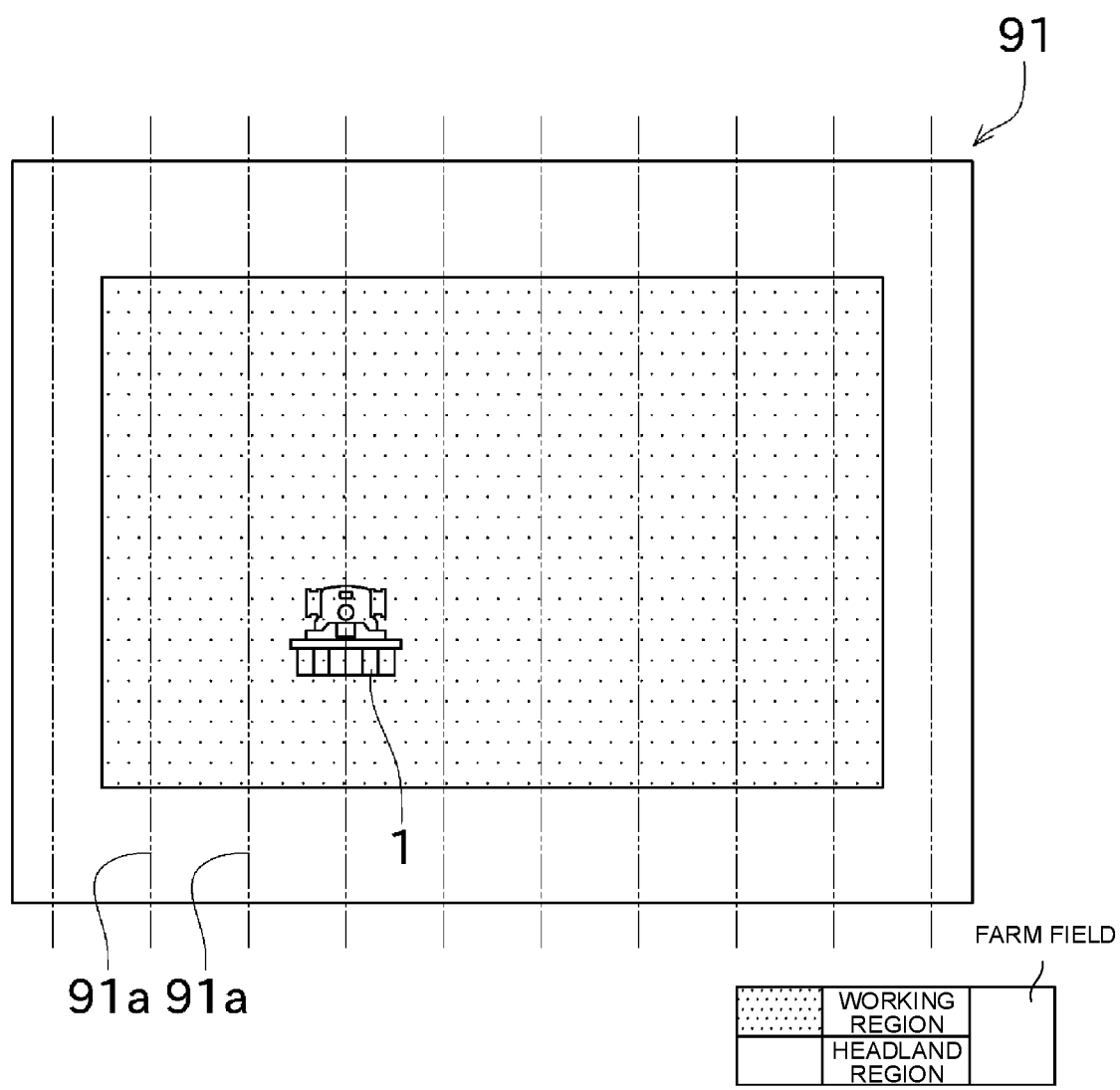
FIG. 4 A diagram illustrating a traveling route created by a route creation unit.

Referring to FIG. 4 next, a farm field and a traveling route created in the farm field are described. The farm field includes a working region and a headland region. The working region, which is in a central portion of the farm field, is a region for conducting a work. The headland region, which is located outside the working region, is a region that is used for appropriately conducting a work in the working region. For instance, the headland region is used for causing the rice seedling transplanting machine 1, which has entered the farm field, to move to a position where the work in the working region is started. The headland region is also used as a region for causing the rice seedling transplanting machine 1 to turn. The traveling route may be created without distinguishing the working region and the headland region from each other.

In the present embodiment, a traveling route 91 illustrated in FIG. 4 is previously created as a traveling route for causing the rice seedling transplanting machine 1 to autonomously travel. The traveling route 91 is created by the route creation unit 82. As illustrated in FIG. 4, the traveling route 91 is constituted of a plurality of linear routes 91a. The traveling route 91 is a route for only allowing autonomous travel in a linear portion. In the present embodiment, a turning route is not previously created because turning is performed in a position according to an operation by the operator as will be described later. The route creation unit 82, however, may previously create a turning route. In that case, the traveling route includes linear routes and turning routes connecting the linear routes together.

The linear routes 91a are each a route in a straight line form and are parallel to one side (shorter side, for instance) of a contour of the farm field or the working region. The linear routes 91a are not particularly limited in length. The route creation unit 82 may create the linear routes 91a, which extend within the working region, or create the linear routes 91a, which extend beyond the working region or the farm field. The intervals, at which the linear routes 91a are arranged, are specified based on a working width, an overlap length (length indicating to what extent in the vehicle width direction neighboring working ranges are to be made overlapping with each other), a working space (namely, a length indicating to what extent in the vehicle width direction neighboring working ranges are to be spaced) or the like.

Figure 5:
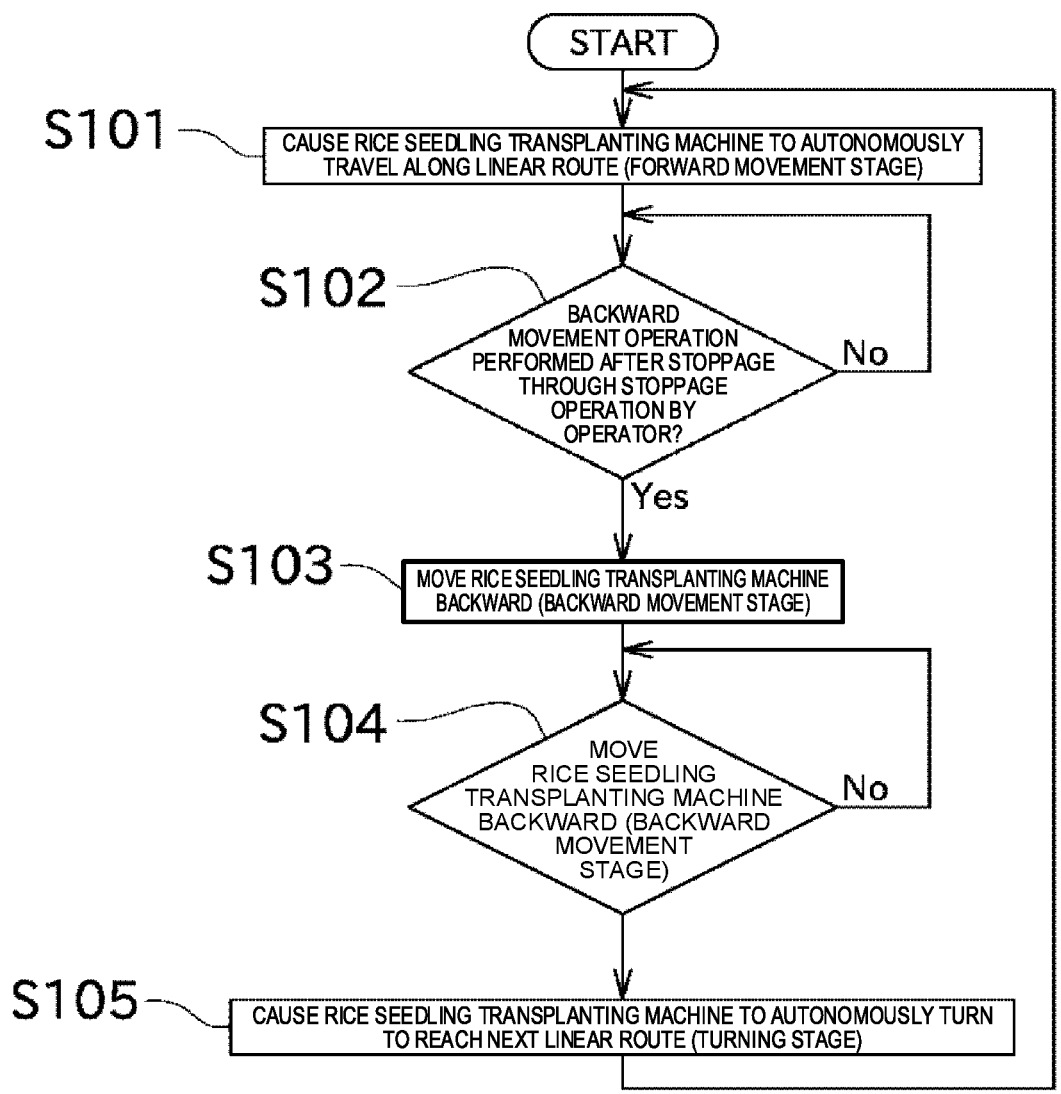
FIG. 5 A flowchart illustrating processing for causing the rice seedling transplanting machine to turn in the vicinity of a farm field edge.
Figure 6:
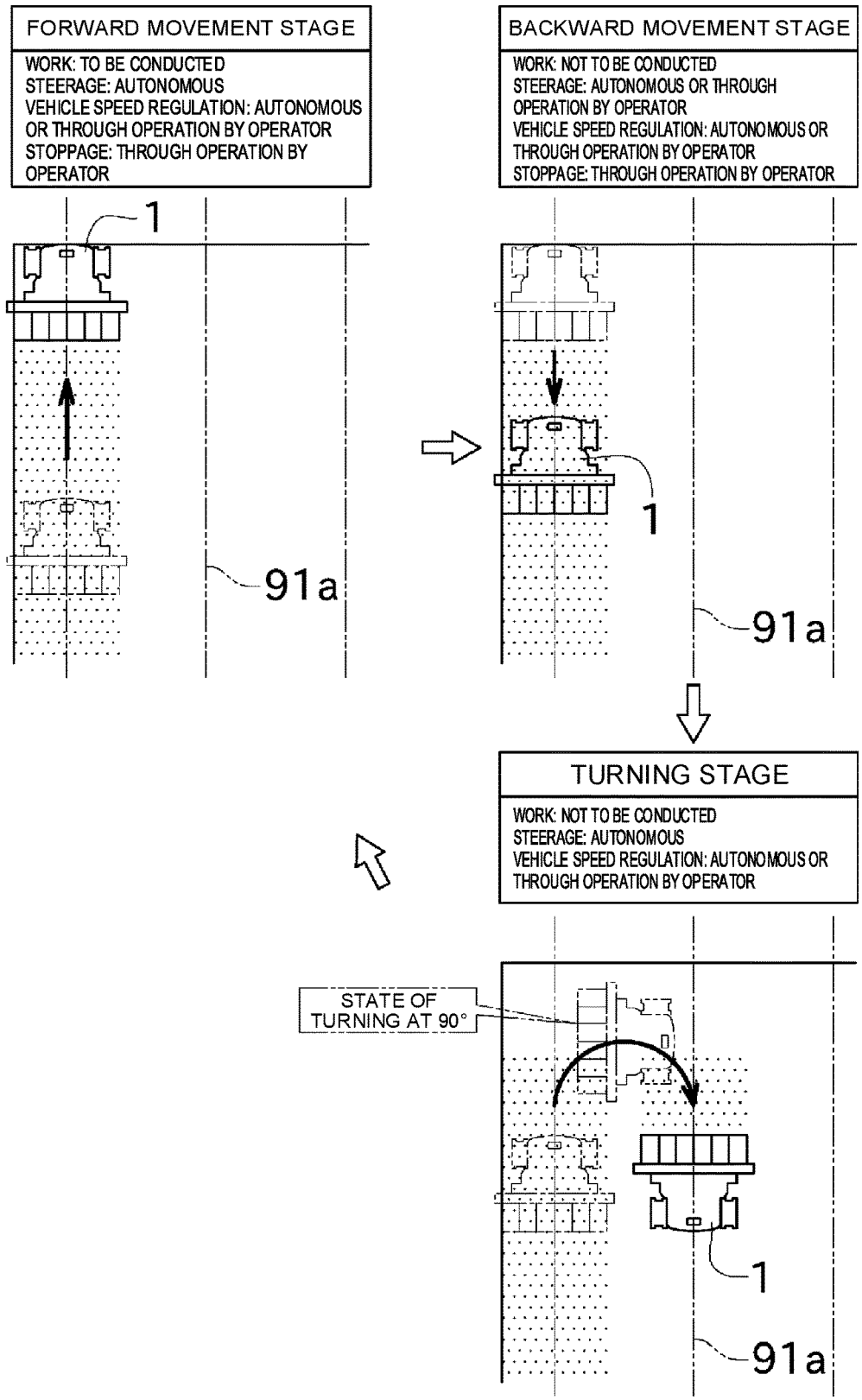
FIG. 6 A diagram illustrating how the rice seedling transplanting machine is caused to turn in the vicinity of a farm field edge.
Figure 7:
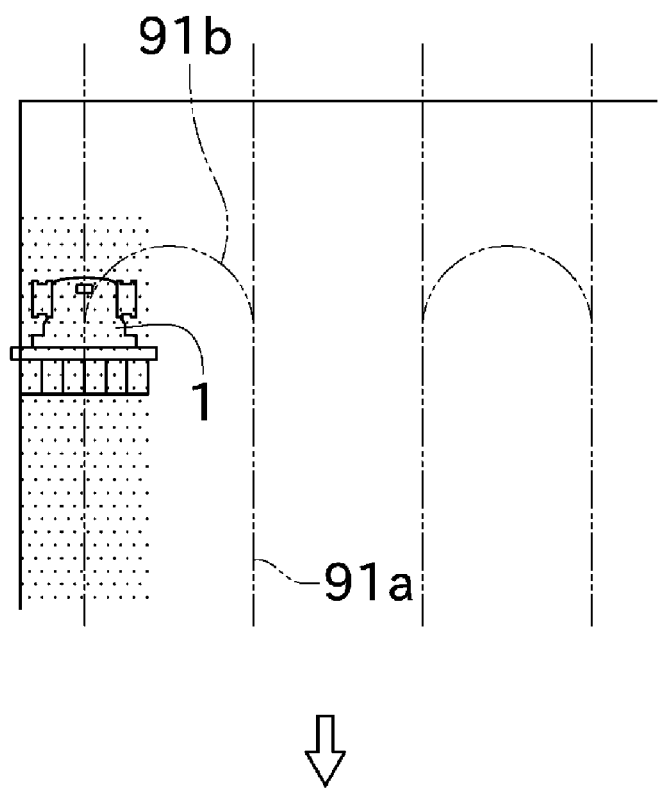
FIG. 7 A diagram illustrating processing performed at another turning stage.
Figure 7:
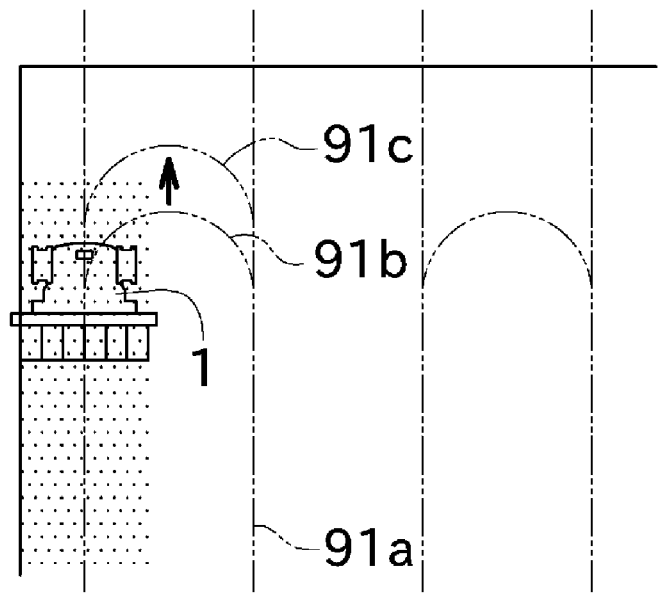

Referring to FIGS. 5 through 7 next, description is made on a flow when the rice seedling transplanting machine 1 is caused to turn in the vicinity of a farm field edge (or a levee edge) in the present embodiment. Flowcharts presented in the first embodiment and a second embodiment are each an example, and processes in each flowchart may be performed in a different order or two or more processes may be performed in parallel. In addition, part of the processes may be omitted or another process may be added.

As described before, it is stated in Patent Literature 1 that turning of a working vehicle is caused to autonomously start in a turning start position specified in advance, so that a position with room is set as the turning start position in order to allow the working vehicle to turn certainly and appropriately. Consequently, in a farm field, a region where the working vehicle conducts a work along linear routes is narrowed. For this reason, a region to conduct a work is narrowed if no works are conducted on a headland region, which prevents an effective use of the farm field. Even if any work is conducted on the headland region, enlargement of the headland region may result in the increase in number of times the headland region is circled, for instance. Taking such circumstances into account, in the present embodiment, a work is conducted up to the vicinity of a farm field edge and turning is performed in the vicinity of the farm field edge, which makes it possible to enlarge the range, in which the rice seedling transplanting machine 1 conducts a work along linear routes. As a result, the number of times the headland region is circled, for instance, is reduced (from two to one, for instance). Specific processing is described below.

The operator stops the rice seedling transplanting machine 1 in a specified position on a linear route 91a and then performs a specified operation on the wireless communications terminal 7, for instance. According to the operation, the forward movement control unit 51 starts autonomous travel of the rice seedling transplanting machine 1 along the linear route 91a (a forward movement stage in step S101 illustrated in FIG. 6). During the forward movement stage, the work by the planting part 14 is conducted and steerage is autonomously implemented. During the forward movement stage, the vehicle speed may autonomously be changed or the vehicle speed may be changed according to an operation performed by the operator on the speed changing operation pedal 27 (specifically, by operating the speed changing operation pedal 27). It is also possible that a speed changing operation lever is provided instead of the speed changing operation pedal 27 and the operator operates the speed changing operation lever so as to change the vehicle speed.

The rice seedling transplanting machine 1 is caused to autonomously travel along the linear route 91a, and the rice seedling transplanting machine 1 travels, in consequence, toward a farm field edge. When the rice seedling transplanting machine 1 reaches the vicinity of the farm field edge, the operator performs a stoppage operation (operation to remove a foot from the speed changing operation pedal 27, for instance) so as to stop the rice seedling transplanting machine 1. In the forward movement stage illustrated in FIG. 6, a statement "stoppage: through operation by operator" means that a process for stopping the rice seedling transplanting machine 1 in the vicinity of the farm field edge is carried out not autonomously but through an operation by the operator (that is to say, the operator determines the timing of stoppage). Stoppage in another situation (where anything extraordinary has occurred, for instance) may autonomously be implemented. The operation to stop the rice seedling transplanting machine 1 in the vicinity of the farm field edge is assigned to the operator, so that it is possible to bring the rice seedling transplanting machine 1 closer to the farm field edge as compared with the case where the rice seedling transplanting machine 1 is caused to autonomously stop. Consequently, the region, where a work is conductible along the linear route 91a, is enlarged. The operator performs, before or after stopping the rice seedling transplanting machine 1, an operation to stop a work, that is to say, an operation to change the position of the planting clutch lever 29. It is also possible that the planting clutch is changed from the transmission state to the blockage state without the operation of the planting clutch lever 29 by the operator. Specifically, the controller 50 changes the planting clutch from the transmission state to the blockage state if detecting that the rice seedling transplanting machine 1 has stopped or changed from the forward movement to the backward movement. That the rice seedling transplanting machine 1 has stopped or changed from the forward movement to the backward movement is detectable based on a detection value of the vehicle speed sensor 66, the position of the main speed change lever 28 or the like.

Next, the operator performs a backward movement operation to move the rice seedling transplanting machine 1 backward, namely, an operation to put the main speed change lever 28 in the "backward movement" position and depress the speed changing operation pedal 27. If determining that the operator has performed the backward movement operation (step S102), the backward movement control unit 52 causes the rice seedling transplanting machine 1 to move backward (a backward movement stage in step S103). During the backward movement stage, the work by the planting part 14 is not conducted. During the backward movement stage, steerage may autonomously be implemented or steerage may be performed by the operator. During the backward movement stage, the vehicle speed may be changed autonomously or according to an operation by the operator. A statement "stoppage: through operation by operator" in a backward movement stage illustrated in FIG. 6 means the same as the statement in the forward movement stage.

The operator performs the stoppage operation as above so as to stop the rice seedling transplanting machine 1 after moving the rice seedling transplanting machine 1 backward up to a position allowing the rice seedling transplanting machine 1 to turn without coming into contact with the farm field edge. As described later, the stoppage of the rice seedling transplanting machine 1 during the backward movement stage may autonomously be implemented. Next, the operator performs a forward movement operation to move the rice seedling transplanting machine 1 forward, namely, an operation to put the main speed change lever 28 in the "forward movement" position and depress the speed changing operation pedal 27. If determining that the operator has performed the forward movement operation (step S104), the turning control unit 53 causes the rice seedling transplanting machine 1 to autonomously turn while moving forward (a turning stage in step S105). At that time, in the present embodiment, turning with autonomous travel is started without the operation of the wireless communications terminal 7 by the operator. Therefore, time and trouble needed by the operator in order to give instructions are saved.

To be more specific: The turning control unit 53 starts the turning with autonomous travel if a plurality of conditions (turning start conditions) for starting the turning with autonomous travel are met. One of the turning start conditions is a condition that the operator has performed the forward movement operation. As another condition, a condition that the position of the rice seedling transplanting machine 1 is close to the farm field edge, a condition that the rice seedling transplanting machine 1 has stopped after moving backward, or the like may be added. Addition of such conditions can prevent the rice seedling transplanting machine 1 from turning in the center of the farm field, for instance. Whether the rice seedling transplanting machine 1 is in the vicinity of the farm field edge can be determined by a comparison between the position of the rice seedling transplanting machine 1 and the position of the farm field.

During the turning stage, the work by the planting part 14 is not conducted. During the turning stage, steering is autonomously implemented. During the turning stage, the vehicle speed may be changed autonomously or according to an operation by the operator.

In the present embodiment, the rice seedling transplanting machine 1 autonomously turns until reaching the next linear route 91a, which is designated in advance, as described below. It is designated in advance whether the rice seedling transplanting machine 1 so turns as to reach a neighboring linear route 91a or the rice seedling transplanting machine 1 so turns as to reach a more distant linear route 91a.

The turning control unit 53 in the present embodiment initially implements turning until the direction of the rice seedling transplanting machine 1 reaches a specified angle. In an example illustrated in FIG. 6, the rice seedling transplanting machine 1 is caused to turn until the direction of the rice seedling transplanting machine 1 becomes orthogonal to the linear route 91a (that is to say, the rice seedling transplanting machine 1 is caused to turn through 90°). Next, the turning control unit 53 causes the rice seedling transplanting machine 1 to autonomously travel with the next linear route 91a (specifically, a point on the linear route 91a) as a destination. Such process allows the rice seedling transplanting machine 1 to turn until reaching the next linear route 91a.

The rice seedling transplanting machine 1 may be caused to turn until reaching the next linear route 91a by another process. Specifically, it is assumed that a first turning route 91b has been created during a previous route creation as illustrated in FIG. 7. The first turning route 91b has been created in a position with room in order to allow the rice seedling transplanting machine 1 to turn certainly and appropriately. In step S105, the turning control unit 53 sets a second turning route 91c by moving the first turning route 91b based on a current position of the rice seedling transplanting machine 1. In general, the second turning route 91c is closer to the farm field edge than the first turning route 91b. Then, the turning control unit 53 causes the rice seedling transplanting machine 1 to autonomously travel along the second turning route 91c. Such process allows the rice seedling transplanting machine 1 to turn until reaching the next linear route 91a.

Subsequently to the arrival at the next linear route 91a, the forward movement control unit 51 causes the rice seedling transplanting machine 1 again to autonomously travel along the linear route 91a (the forward movement stage in step S101). After that, the same processing is performed until the rice seedling transplanting machine 1 reaches the destination. The rice seedling transplanting machine 1, which is caused to turn by the method of the present embodiment, is able to conduct a work up to the vicinity of the farm field edge, so that the region, where a work is conducted along linear routes, is enlarged. As a result, the number of times the headland region is circled, for instance, is reduced (from two to one, for instance).

Figure 8:
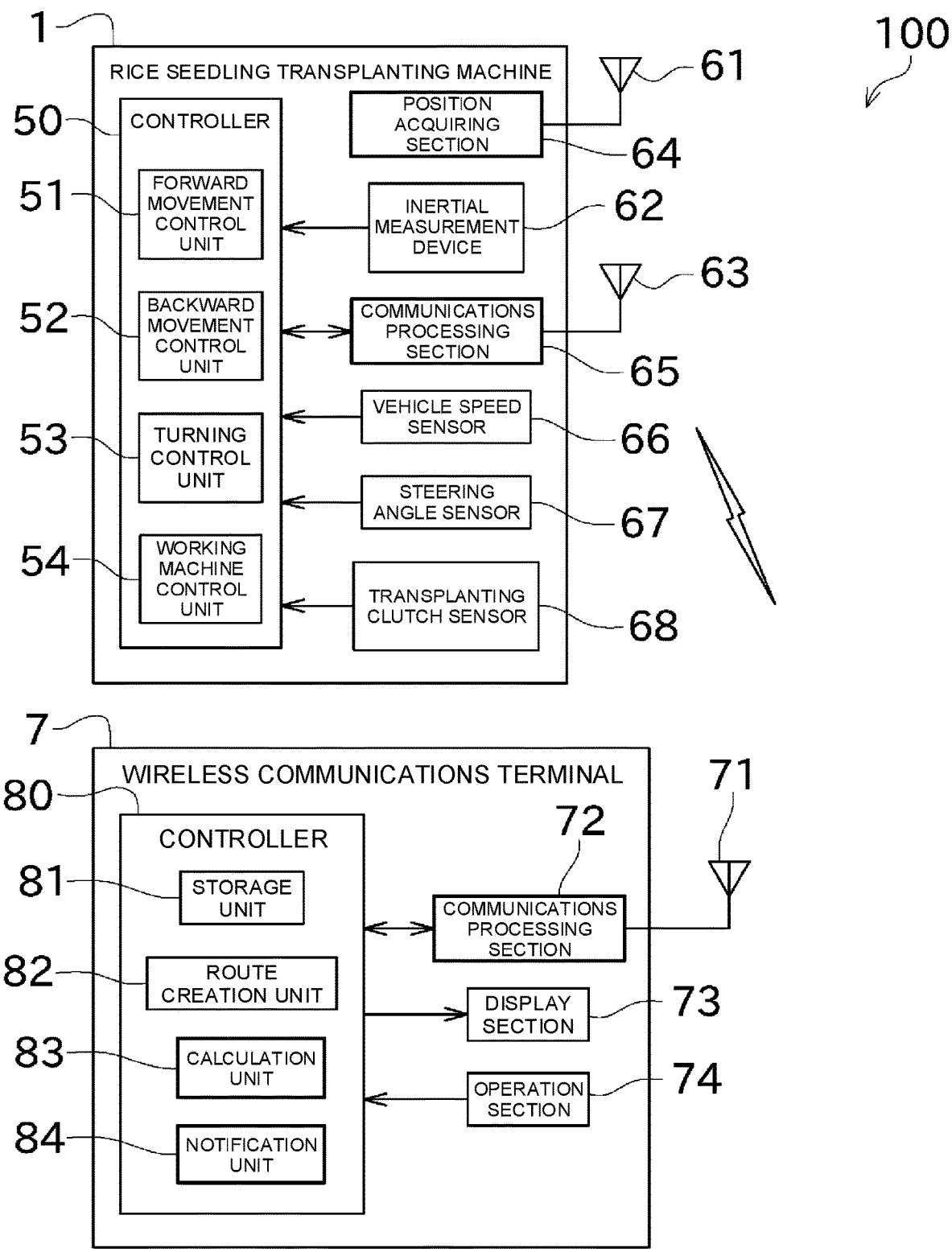
FIG. 8 A block diagram illustrating a rice seedling transplanting machine and a wireless communications terminal in a second embodiment.
Figure 9:
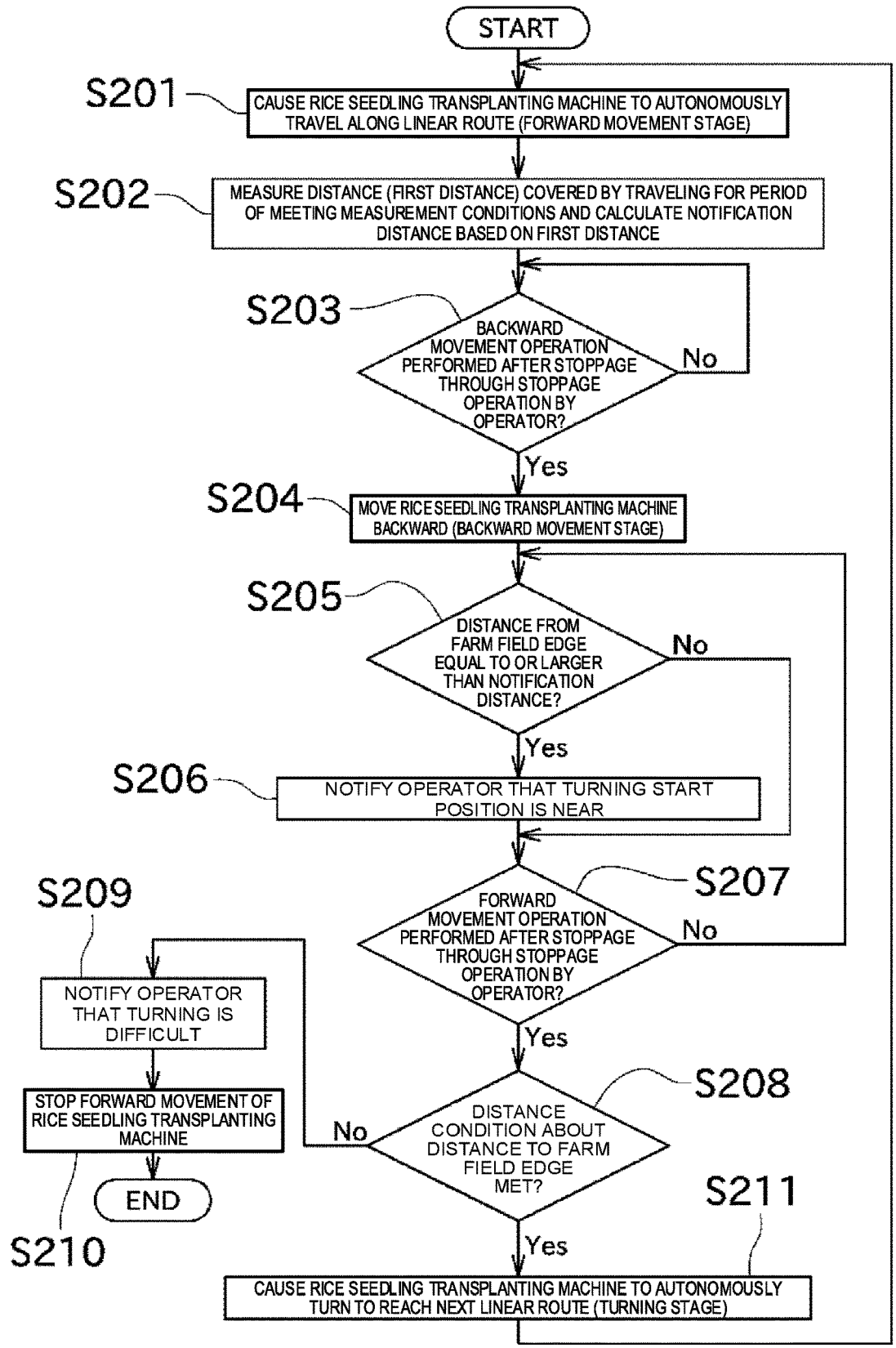
FIG. 9 A flowchart illustrating processing for causing the rice seedling transplanting machine to turn in the vicinity of a farm field edge in the second embodiment.
Figure 10:
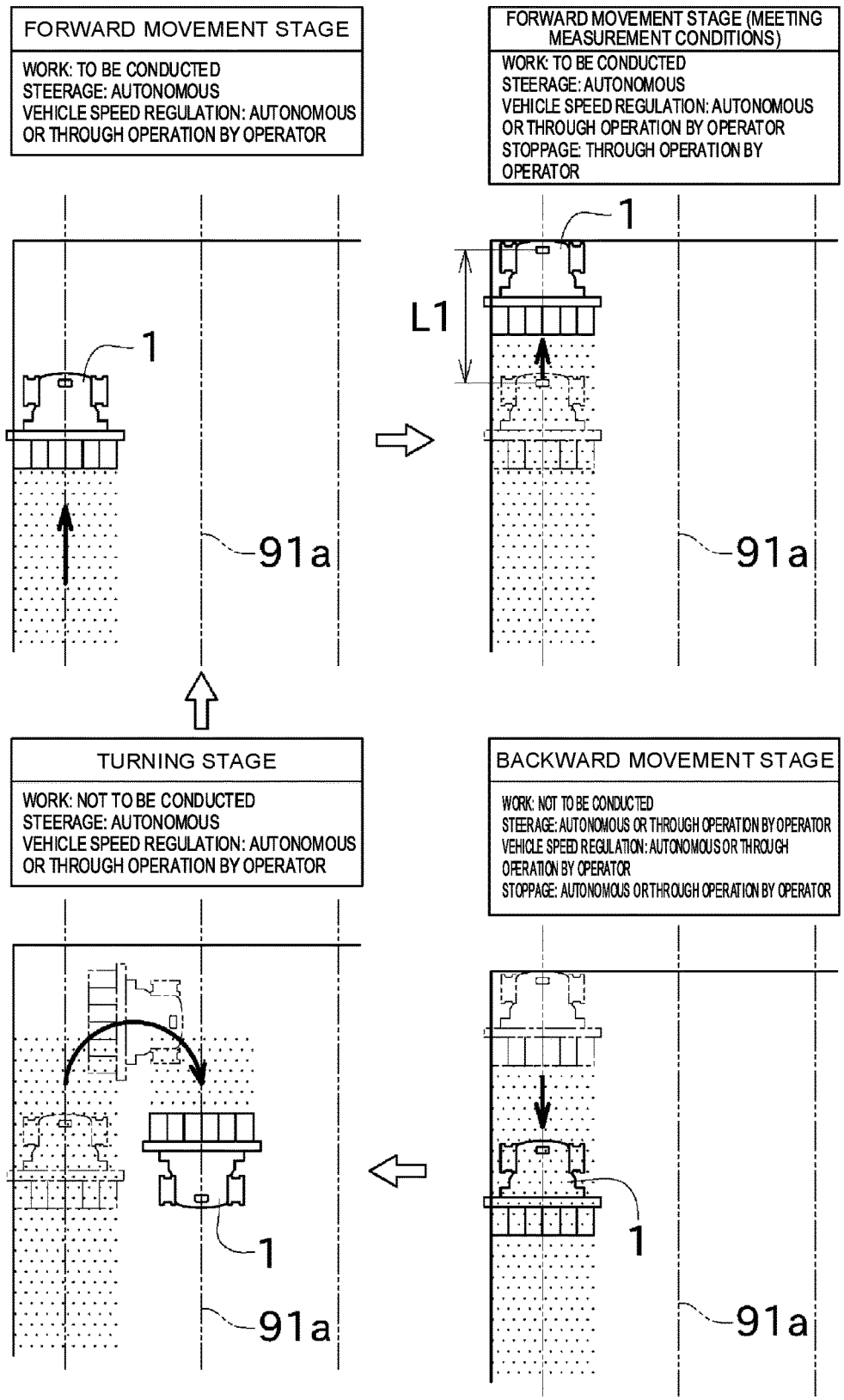
FIG. 10 A diagram illustrating how the rice seedling transplanting machine is caused to turn in the vicinity of a farm field edge in the second embodiment.

Referring to FIGS. 8 through 10 next, an autonomous travel system 100 according to the second embodiment is described. In the description on the second embodiment, members identical or similar to the members in the first embodiment as above are given identical reference signs in the drawings, and the description on such members is sometimes omitted.

As illustrated in FIG. 8, the cooperation between the hardware as described above and software allows the controller 80 of the second embodiment to further serve as a calculation unit 83 and a notification unit 84.

FIG. 9 illustrates processing related to autonomous travel (turning in the vicinity of a farm field edge, in particular) to be performed by the autonomous travel system 100 in the second embodiment. Processes in steps S201, S203, and S204 of a flowchart illustrated in FIG. 9 are the same as the processes in steps S101, S102, and S103 in FIG. 5, respectively, so that the description on such processes is omitted. In the second embodiment, the calculation unit 83 measures a first distance during the forward movement stage (step S202). The first distance refers to a length serving as an index that indicates to what extent the rice seedling transplanting machine 1 can be made close to the farm field edge. Specifically, the first distance is the distance, which the rice seedling transplanting machine 1 travels for a period of meeting measurement conditions. The first distance is represented by L1 in FIG. 10.

The period of meeting measurement conditions refers to a period extending from the meeting of a measurement start condition to the meeting of a measurement finish condition. The measurement start condition is exemplified by a condition that the distance from the rice seedling transplanting machine 1 to the farm field edge has become equal to or less than a threshold and a condition that the operator has performed an operation to change autonomous travel to manual travel. The measurement finish condition is exemplified by a condition that the rice seedling transplanting machine 1 has stopped, a condition that the backward movement of the rice seedling transplanting machine 1 has been started, a condition that an operation to change the position of the planting clutch lever 29 from a working position to a non-working position has been performed, and a condition that the planting part 14 has gone up. Which among such measurement start conditions and measurement finish conditions is to be applied may be settable.

After calculating the first distance as the distance, which the rice seedling transplanting machine travels for the period of meeting measurement conditions, the calculation unit 83 further calculates a notification distance (step S102). The notification distance refers to a distance used for notifying the operator during the backward movement stage that a turning start position is near. For instance, the use of the first distance and the position of the farm field makes it possible to determine how close to the farm field edge the rice seedling transplanting machine 1 can be made without coming into contact with the farm field edge. In addition, how large space is required ahead when the rice seedling transplanting machine 1 is caused to turn can be determined from information on a vehicle body of the rice seedling transplanting machine 1. Consequently, the use of the first distance makes it possible to specify the minimum distance required for causing the rice seedling transplanting machine 1 to turn in a position close to the farm field edge without coming into contact with the farm field edge. The minimum distance may be set as the notification distance or a distance with a value slightly larger or smaller than the value of the minimum distance may be set as the notification distance.

During the backward movement stage, the notification unit 84 determines whether or not the distance from the farm field edge to the rice seedling transplanting machine 1 is equal to or larger than the notification distance (step S205) and, if such distance is equal to or larger than the notification distance, notifies the operator that the turning start position is near (step S206). The method for notifying the operator varies, so that generation of a warning sound and display of a warning on the display section 73 are thinkable. The notification as above makes it possible to let the operator know an appropriate time to stop the rice seedling transplanting machine 1 (namely, an appropriate turning start position).

In the first embodiment, it is assumed that the stoppage during the backward movement stage is carried out through an operation by the operator. In the second embodiment, in contrast, information on the distance, such as the minimum distance and the notification distance, is obtained. Therefore, the rice seedling transplanting machine 1 may be caused by the controller 50 to autonomously stop. In the first embodiment and the second embodiment, the change from the forward movement stage to the backward movement stage is carried out by the operator by putting the main speed change lever 28 in the "backward movement" position. The backward movement stage may be started by automatically change the rice seedling transplanting machine 1 to the state of backward movement with a specified actuator after the stoppage of the rice seedling transplanting machine 1.

Not only in the first embodiment but the second embodiment, the condition that the operator has performed the forward movement operation is one of the turning start conditions (step S207). In the second embodiment, a distance condition about the distance to the farm field edge is further set as one of the turning start conditions. The distance condition refers to a condition about a distance for causing the rice seedling transplanting machine 1 to turn without coming into contact with the farm field edge. Therefore, the distance condition is a condition that a current distance from the rice seedling transplanting machine 1 to the farm field edge, for instance, is larger than the minimum distance as above. Since some room is necessary, the distance condition may be set using a value slightly larger than the value of the minimum distance. The notification unit 84 determines whether the distance condition is met after the forward movement operation by the operator (step S208) and, if the distance condition is not met, notifies the operator that turning is difficult (step S209). If turning is difficult, the controller 50 stops the rice seedling transplanting machine 1 (step S210). In that case, the operator moves the rice seedling transplanting machine 1 backward again to a position allowing turning and then turns the rice seedling transplanting machine 1. The processes in step S207 and succeeding steps may be performed again after completion of the backward movement of the rice seedling transplanting machine 1. Thus in the second embodiment, processing related to the distance condition is performed, which makes it possible to prevent an unreasonable turning from being autonomously performed even if a backward movement distance for the rice seedling transplanting machine 1 is not enough.

If the distance condition is met, it is considered that a turning start condition is met, so that the turning control unit 53 causes the rice seedling transplanting machine 1 to autonomously turn until reaching the next linear route 91a (step S211).

Features of the second embodiment may partially be applied to the first embodiment. For instance, only the feature, in which the distance condition is included in the turning start conditions, may be applied to the first embodiment if a distance condition for starting autonomous travel is specified in advance and the first distance does not need to be measured.

As described above, the autonomous travel systems 100 of the above embodiments each include the route creation unit 82, the forward movement control unit 51, the backward movement control unit 52, and the turning control unit 53. The route creation unit 82 creates a plurality of linear routes 91a arrayed in a farm field. The forward movement control unit 51 autonomously implements at least steerage so as to cause the rice seedling transplanting machine 1 to travel along the linear routes 91a while causing the rice seedling transplanting machine 1 to conduct a work. The backward movement control unit 52 causes the rice seedling transplanting machine 1 to move backward according to an operation by the operator or autonomously, without causing the rice seedling transplanting machine 1 to conduct a work, after the operator stops the rice seedling transplanting machine 1, which is traveling toward a farm field edge. The turning control unit 53 autonomously implements at least steerage so as to cause the rice seedling transplanting machine 1 to turn toward a linear route designated in advance, without causing the rice seedling transplanting machine 1 to conduct a work, on condition that a forward movement instruction is given by the operator after the rice seedling transplanting machine 1, which is being caused to move backward by the backward movement control unit 52, is stopped by the operator or autonomously stops.

Owing to such configuration, which gives the operator the charge of stopping the rice seedling transplanting machine 1 in the vicinity of the farm field edge, it is possible to conduct a work closer to the farm field edge as compared with the case where the rice seedling transplanting machine 1 is made to autonomously stop. As a result, the region, where the rice seedling transplanting machine 1 conducts a work along linear routes, is enlarged. In addition, the forward movement instruction from the operator is assumed as one of turning start conditions, so that instructions of the operator are simplified and turning is started earlier.

In each of the autonomous travel systems 100 of the above embodiments, the turning control unit 53 sets a turning route (the second turning route 91c) connecting with the linear route 91a designated in advance and causes the rice seedling transplanting machine 1 to turn along the second turning route 91c.

The second turning route 91c as set allows the rice seedling transplanting machine 1 to turn more certainly until reaching the linear route 91a.

In each of the autonomous travel systems 100 of the above embodiments, the backward movement control unit 52 autonomously implements at least steerage to cause the rice seedling transplanting machine 1 to move backward along the linear routes 91a without causing the rice seedling transplanting machine 1 to conduct a work.

In consequence, the rice seedling transplanting machine 1 passes through almost the same positions during the forward movement and during the backward movement, which prevents a traveling trace from being left in an unwanted position.

The autonomous travel system 100 of the second embodiment includes the calculation unit 83 and the notification unit 84. The calculation unit 83 calculates the first distance as the distance, which the rice seedling transplanting machine 1 travels for the period of meeting measurement conditions, while the rice seedling transplanting machine 1 is traveling toward the farm field edge. The notification unit 84 notifies the operator of information on a stop position of the rice seedling transplanting machine 1 based on the first distance while the rice seedling transplanting machine 1 is being caused to move backward by the backward movement control unit 52.

Owing to such configuration, it is possible to let the operator know the position, where the rice seedling transplanting machine 1 should be stopped, if the operator is to stop the rice seedling transplanting machine 1 during the backward movement.

In the autonomous travel system 100 of the second embodiment, the calculation unit 83 further calculates the distance condition as a condition about the distance from the rice seedling transplanting machine 1 to the farm field edge based on the first distance. The distance condition is additionally included as a condition, under which the turning control unit 53 starts turning of the rice seedling transplanting machine 1.

Owing to such configuration, turning is not started in a position too close to the farm field edge, for instance, so that an unreasonable turning is prevented.

Preferred embodiments of the present invention have been described above, while the above configurations can be modified as described below, for instance.

In the above embodiments, the forward movement stage is automatically started after the termination of the turning stage. It, however, is also possible to temporarily stop the rice seedling transplanting machine 1 after the termination of the turning stage. In such case, the operator can supply a chemical tank in a rear portion of the rice seedling transplanting machine 1 with a chemical prepared on a levee. Whether to temporarily stop the rice seedling transplanting machine 1 after the turning stage may be settable. A temporary stoppage of the rice seedling transplanting machine 1 after the turning stage may be made available only once every two or more times (or only in a position specified in advance).

DESCRIPTION OF REFERENCE NUMERALS 1 rice seedling transplanting machine (working vehicle)
51 forward movement control unit
52 backward movement control unit
53 turning control unit
82 route creation unit
83 calculation unit
100 autonomous travel system

The invention claimed is:

1. An autonomous travel system comprising:
a route creation unit that creates a plurality of linear routes arrayed in a farm field;
a forward movement control unit that autonomously implements at least steerage to cause a working vehicle to travel along the plurality of linear routes while causing the working vehicle to conduct a work;
a backward movement control unit that causes the working vehicle to move linearly backward opposite to a forward linear direction either according to an operation by an operator or autonomously, without causing the working vehicle to conduct the work, after the operator stops the working vehicle traveling toward an edge of the farm field along the plurality of linear routes by the forward movement control unit; and
a turning control unit that autonomously implements at least the steerage to cause the working vehicle to turn along a turning path connected to a linear route designated in advance without causing the working vehicle to conduct the work and without moving in a linearly forward direction between an end of backward movement and a start of turning, on condition that a forward movement instruction is given by the operator after the working vehicle, which is being caused to move backward by the backward movement control unit, is stopped either by the operator or autonomously.

2. The autonomous travel system according to claim 1, wherein the turning control unit sets a turning route connecting with the linear route designated in advance and causes the working vehicle to turn along the turning route.

3. The autonomous travel system according to claim 1, wherein the backward movement control unit autonomously implements at least the steerage to cause the working vehicle to move backward along the linear route designated in advance without causing the working vehicle to conduct the work.

4. The autonomous travel system according to claim 1, comprising:
a calculation unit that calculates a first distance as a distance, which the working vehicle travels for a period of meeting measurement conditions, while the working vehicle is traveling toward the edge of the farm field; and
a notification unit that notifies the operator of information on a stop position of the working vehicle based on the first distance while the working vehicle is being caused to move backward by the backward movement control unit.

5. The autonomous travel system according to claim 4, wherein the calculation unit further calculates a distance condition as a condition about a distance from the working vehicle to the edge of the farm field based on the first distance, and wherein the distance condition is additionally included as a condition, under which the turning control unit starts turning of the working vehicle.

6. An autonomous travel system comprising:
a route creation unit that creates a plurality of linear routes arrayed in a farm field;
a forward movement control unit that autonomously implements at least steerage to cause a working vehicle to travel along the plurality of linear routes while causing the working vehicle to conduct a work;
a backward movement control unit that causes the working vehicle to move backward opposite to a forward linear direction either according to an operation by an operator or autonomously, without causing the working vehicle to conduct the work, after the operator stops the working vehicle traveling toward an edge of the farm field along the plurality of linear routes by the forward movement control unit; and a turning control unit that autonomously implements at least the steerage to cause the working vehicle to turn along a turning path connected to a linear route designated in advance without causing the working vehicle to conduct the work and without moving in a linearly forward direction between an end of backward movement and a start of turning, on condition that a forward movement instruction is given by the operator after the working vehicle, which is being caused to move backward by the backward movement control unit, is stopped either by the operator or autonomously, wherein the backward movement control unit autonomously implements at least the steerage to cause the working vehicle to move backward along the linear route designated in advance without causing the working vehicle to conduct the work.

* * * * *